Oct. 11, 1955            D. W. HAMM            2,720,435
STEEL RAIL, SPACER AND CIRCUMFERENTIALLY
COMPRESSIBLE COMBINATION PISTON RING
Filed June 30, 1953

*INVENTOR.*
DOUGLAS W. HAMM
BY
Frank E. Liverance, Jr.
ATTORNEY

United States Patent Office

2,720,435
Patented Oct. 11, 1955

2,720,435

STEEL RAIL, SPACER AND CIRCUMFERENTIALLY COMPRESSIBLE COMBINATION PISTON RING

Douglas W. Hamm, Muskegon, Mich., assignor to Muskegon Piston Ring Company, Muskegon, Mich., a corporation of Michigan Application June 30, 1953, Serial No. 365,091

3 Claims. (Cl. 309—45)

This invention relates to a novel piston ring combination including a steel rail or rails, spacer and circumferentially compressible carrier therefor, which carrier, when it is installed in the ring groove of a piston and the piston within a cylinder, serves as an expander and forces the steel rail or rails against the cylinder wall and, may additionally serve to scrape excess oil from the cylinder wall.

Piston rings have been made which consist solely of a circumferentially compressible ring and which include in their structure a consecutive series of very closely spaced wall engaging segments. Between adjacent segments there is a small space which is designed to be substantially, though not completely, closed when the ring is installed in service. Such spaces being large in number around the entire ring are not controllable in all cases to the exact, very narrow limits required so that a passage of oil through such spaces between the adjacent edges of the segments may occur, and in many cases does occur, with a resultant deficiency in the action of the ring to salvage excess oil and return it to the engine crank case.

It is an object and purpose of the present invention to correct such oil passage to and above the piston ring which ring is installed in the lowermost ring groove in a piston. Such lower groove is generally known as the oil groove of the piston and the piston ring disposed therein being known as the oil ring of the piston. Of course it is not absolutely necessary that there shall be only one oil groove for each piston, but at least there would be one at the lower portion of the ring carrying part of the piston.

My invention also has for another object and purpose novel structure permitting the quick, ready and easy installation of the composite piston ring which I have produced in the ring groove of piston in which it is to be located, so that it may be conveniently used either in newly assembled engines or in conjunction with service requirements of used engines. Furthermore the piston ring is one which is readily fabricated and manufactured with economy in large quantity of production.

An understanding of the invention may be had from the following description, taken in connection with the accompanying drawing, in which, Fig. 1 is a plan view of a complete piston ring of my invention with only a portion of the circumferentially compressible ring element thereof disclosed in detail.

Like reference characters refer to like parts in the different figures of the drawing.

Figure 4:
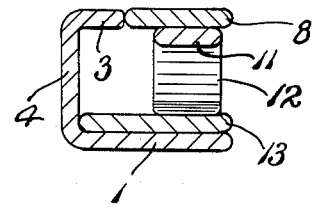
Fig. 4 is a similar section showing a modification of structure of the ring but obtaining the same effects, this being one of several modifications which are possible.

The circumferentially compressible ring element which is used, preferably has lower segments 1 separated by narrow slits 2 and upper segments 3 which are considerably shorter than the lower segments 1. The upper and lower segments 1 and 3 have connected therewith, each of them, two vertical webs 4 separated by slots 5. The slots 5 are wider than the slits at 2 and also wider than like slits 6 which separate the upper shorter segments 3, which are of substantially the same width as the slits 2. Such slots 5, however, may be of the same width as slits 2 and 6 without affecting the invention. Alternate slots 5, at their upper end portions, are connected with the slits 6 and likewise the alternate slots 5 not connected with the slits 6 are connected at their lower ends with the slits 2 between the lower segments 1. The two ends of the ring member come together in an abutting contact or radial parting at 7 in such ring member.

Figure 1:
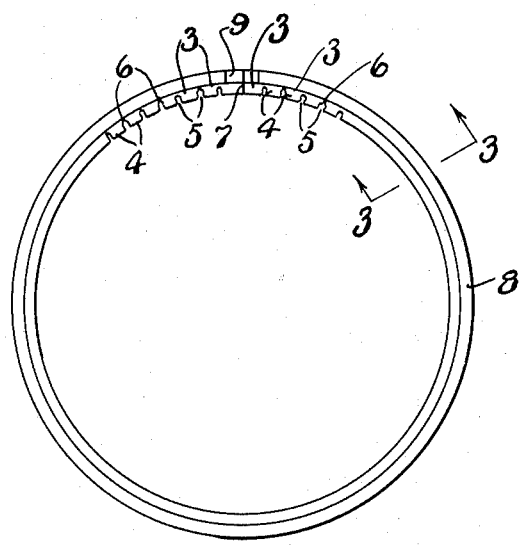

Such circumferentially compressible ring member in itself is old except that in such old ring member the upper segments 3 extend outwardly as far as the lower segments 1. With my invention, the cutting off of the major portions of the previous segments at the upper side of the ring leaves a space which is filled by a thin metallic rail 8, which has a parting 9 at one side (Fig. 1) which normally springs open, but which is closed when installed within an engine cylinder. The thickness of metal used in the rail 8 is substantially the same as that from which the circumferentially compressible ring element is made, and the radial dimension of the ring is such that its outer edges, when the rail is closed, is substantially in vertical alignment with the outer edges of the lower segments 1, as shown in Fig. 4.

Figure 2:
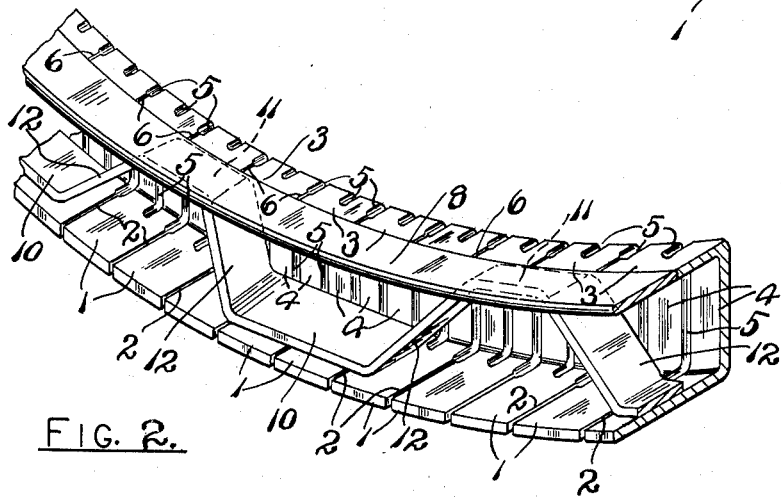
Fig. 2 is an enlarged fragmentary perspective view of a portion of a complete piston ring made in accordance with my invention, the view being taken looking at the piston ring at the outer curved edges thereof.

A supporting and spacing element of a generally corrugated form, made from a single length of thin flat metal, has alternate lower and upper horizontal sides 10 and 11, respectively, integrally connected together by the inclined legs 12 as shown in Fig. 2. The lower sections 10 of such corrugated member rest upon the upper sides of the lower segments 1, and the rail 8 at its lower side rests upon the upper sides of the upper horizontal sections 11. Such spacer is of a height such that the rail 8 is in the same horizontal plane with the segments 3. The rail 8 may be and preferably is cemented to the horizontal portion 11 of the spacer, using a cement or equivalent which retains the parts against separation, making a single installation unit. The cement, however, if used, preferably is one which softens and dissolves under the effects of high temperature and lubricating oil in a short time after the ring has been installed and used in an internal combustion engine. Of course such cementing of the parts as described may be dispensed with without departing from the invention.

In Fig. 4, a wider thin rail 13, parted at one side like the parting 9 in the first described rail 8, is placed against the upper sides of the lower segments 1, the width being such that the inner edge of the rail 13 comes against the web sections 4, while its outer edge is in vertical alignment with the outer edges of the segment 1. Other arrangements of the rails than those shown in Figs. 3 and 4 will occur to others and have occurred to me, securing the desirable results of the invention and operating upon the same principles of operation.

The ring is installed over a piston by opening at the partings at 7 and 9 until the desired groove to receive the ring is reached. The circumferentially compressible element of the ring with its parting closed at 7, before it is compressed circumferentially to go within an engine cylinder, has a larger exterior diameter than the interior diameter of the cylinder. Upon its compression circumferentially to a smaller circumference, the strain upon the parts of such ring element engenders a force tending to expand and increase the diameter of the circumferentially compressible ring element, which causes it to force the outer edges of the segments 1 and the outer edge of the rail 8 against the cylinder wall, or as in Fig. 4, the outer edges of not only such segments 1 and the rail 8 but of the wider rail 13.

Figure 3:
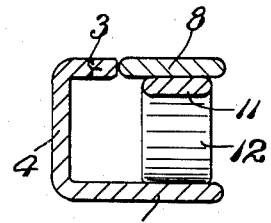
Fig. 3 is an enlarged transverse section substantially on the plane of line 3—3 of Fig. 1.

It is apparent that with such construction of piston ring, the oil passing gaps, in the structure shown in Fig. 3, previously present at the slits 6 between wider segments 3 are eliminated. The upper rail 8 has no gap or parting except at 9 and such parting or gap is substantially closed when in an engine cylinder. This insures against undesired passage of oil, with a marked and very desirable increase in the salvaging of excess oil from an engine cylinder. In the form shown in Fig. 4 passage of oil through the slits 2 is also eliminated.

In the present disclosure one form of circumferentially expansible ring element is shown but the invention is applicable to other forms thereof which have one only as well as both series of segments separated at adjacent edges by narrow slits. Thus the upper segments 3 may be shortened or in fact entirely eliminated with a corresponding shortening of the slots 5, the rail 8 being widened to correspond without. The invention also is not limited to the one form or type of circumferentially compressible ring element which is shown. The structure is readily manufactured and is easily assembled as a single installation unit if such single unit is desired, and is economical to manufacture.

The invention is defined in the appended claims and is to be considered comprehensive of all forms of structure coming within their scope.

I claim:

1. A parted, circumferentially compressible piston ring element having two spaced series of radially separated outwardly extending segments, one series of such segments being longer and extending outwardly farther than the other, a parted thin rail located in the same plane as the shorter segments, and a parted spacer between said rail and said longer segments.

2. A parted, circumferentially compressible, piston ring element, vented for oil passage therethrough, having an upper and lower series of successive segments, the segments of each series being radially separated at adjacent edges, and each series of segments being in a common plane, the lower segments being longer and extending outwardly farther than the upper segments, a parted thin rail located in the same plane as the shorter segments above and parallel to the lower segments, and a vented spacer between said rail and the lower segments.

3. A parted, circumferentially compressible piston ring element vented for oil passage therethrough, having an upper and lower series of successive segments located in two spaced parallel horizontal planes, the segments of each series being separated at adjacent side edges, the lower segments being longer and extending outwardly farther than the upper segments, a parted, thin metallic rail located around the outer edges of said upper segments in the same horizontal plane therewith, and a parted corrugated, metal spacer under said rail and above said lower segments, said spacer having upper and lower spaced horizontal sections, staggered with respect to each other and integral connecting sections between said horizontal sections, said rail bearing against the upper sides of said horizontal sections.

References Cited in the file of this patent
UNITED STATES PATENTS

| | | |
|---|---|---|
| 2,410,177 | Marvin et al. | Oct. 29, 1946 |
| 2,551,878 | Ernst | May 8, 1951 |
| 2,635,022 | Shirk | Apr. 14, 1953 |